United States Patent [19]
Hughes

[11] Patent Number: 5,965,857
[45] Date of Patent: Oct. 12, 1999

[54] FLOTATION CELL ROW

[75] Inventor: Stephen Hughes, New South Wales, Australia

[73] Assignee: Baker Hughes Incorporated, Houston, Tex.

[21] Appl. No.: 08/818,976

[22] Filed: Mar. 14, 1997

[30] Foreign Application Priority Data

Mar. 14, 1996 [AU] Australia .................................. PN8762

[51] Int. Cl.⁶ ................................ B03D 1/14; B03D 1/16
[52] U.S. Cl. ................................. 209/168; 209/169; 209/1
[58] Field of Search ................................ 209/1, 168, 169, 209/170

[56] References Cited

U.S. PATENT DOCUMENTS

| | | |
|---|---|---|
| 1,967,028 | 7/1934 | Howe . |
| 2,047,643 | 7/1936 | Mayer . |
| 2,494,602 | 1/1950 | Wright . |
| 5,205,926 | 4/1993 | Lawrence . |
| 5,687,609 | 11/1997 | Schmalzel . |

FOREIGN PATENT DOCUMENTS 462442  1/1950  Canada .

OTHER PUBLICATIONS

Claridge et al "Operation and Maintanance in Mineral Processing Plants", The Canadian Institute of Mining and Metallurgy (CIMM), © 1989, pp. 267–290.

*Primary Examiner*—Thomas M. Lithgow
*Attorney, Agent, or Firm*—Carl A. Rowold

[57] ABSTRACT

A flotation cell row including a row of cells through which, in use, a process liquid flows in turn, including a first bank of cells having a last cell 4 being the most downstream cell and a second bank of cells having a first cell 5 being the most upstream cell, the second bank being the bank immediately downstream of the first bank, in which one or both of the last cell 4 and the first cell 5 are structured to define a port 37 having a rim through which, in use, the process liquid flows from the last cell 4 to the first cell 5, and a valve member 10 mounted for movement between a closed position abutting the rim 44 and an open position spaced from rim 44, to control flow of process liquid through the port 37.

22 Claims, 12 Drawing Sheets

FLOTATION CELL ROW

FIELD OF THE INVENTION

The invention relates generally to a row of cells for liquid and means to control the flow of fluid from one bank of cells to the following downstream bank of cells. The invention has a particular, but not exclusive, application to rows of cells used in froth flotation processes for treating ore.

BACKGROUND

Many ores require significant processing after having been mined. Generally, this is for the purpose of extracting the particular metal or other component of the ore, known as the "value", which has commercial value in its purified form. One technique for extracting the value is known in the art as "froth flotation". This technique is generally carried out by constructing a series of tanks, or "cells", through which the process liquid flows. For successful froth flotation, it is required that the level of ore process liquid in the cells remains at a predetermined amount while process liquid flows from the most upstream cell to the most downstream cell. The process liquid may contain significant solid pieces of one which can be abrasive to the insides of the cells and process liquid conduits.

Typically, cells are connected in groups of 2, 3, 4 or more and these groups are known as "banks". Each bank is generally separated from the next bank downstream by some means for controlling the flow of process liquid from the last (or most downstream) cell in the upstream bank to the first (or most upstream) cell in the following downstream bank. The downstream bank is physically located at a lower level than the upstream bank to facilitate the flow of process liquid by gravity.

Traditionally, a "connection box" is provided between two banks. A similar component, known as a "discharge box", is located downstream of the last bank of cells. Pulp flows from the last cell in the first bank to the first cell in the second bank through the connection box. The connection box is fluidly connected to both the last cell in the first bank and the first cell in the second bank. Generally, the inlet for the connection box is adjacent to the base of the last cell in the first bank and the outlet of the connection box is in the side wall of the first cell of the downstream bank. A dart valve is usually arranged in a port in a horizontal partition within the connection box. This partition separates either a pair of adjacent chambers defined by a vertical baffle in the connection box, or a larger upper inflow chamber and a smaller lower outflow chamber defined by the partition.

Discharge boxes are generally of similar construction and are used to control the amount of process liquid in the most downstream bank of cells, by controlling the amount of fluid permitted to flow through the discharge box.

The aforementioned vertical baffle, or a side plate separating the connection box from the downstream cell, may include an upper level slot to permit an amount of process liquid or froth to flow from the upstream bank to the downstream bank and bypass the valve. This slot is often referred to as a "weir". Thus, if there is a sudden surge in the volume of process liquid for which the valves cannot be adjusted quickly enough (for proper operation of the row of cells), the extra process liquid can flow through the weir to He next downstream bank of cells. Such weirs are particularly necessary where the valve control mechanisms are manual, or otherwise slow to react.

A dart valve essentially includes a conically shaped valve member (the "dat") which caa be inserted into or withdrawn from an elastomer lined orifice plate or grommet. With dart valves used in connection boxes, the valve member is generally a solid elastomer to minimise wear. The valve member is connected by a connecting rod to an actuator, which is typically pneumatic.

Apart from dart valves, it is also known to use an elastomer lined "pinch" valve between the ends of banks of cells. These valves are relatively inexpensive and do not require connection boxes but do have a tubular component extending between the cells. These valves have a relatively short working life as the elastomer lining suffers from solids in the process liquid grazing the lining as the process liquid flows through the valves. Further, these valves generally have a relatively narrow range of operation and a non-linear response to adjustment. Thus, pinch valves do not require use of a connection box but can be difficult to adjust accurately, and therefore are difficult to use. This is significant because the level of process liquid in a cell needs to be kept to within a very narrow range (such as 6 millimeters in some installations).

FIGS. 1 and 2 show a typical known construction of a connection box A between two cells B and C, cell B being the last cell in the upstream bank and cell C being the first cell in the downstream bank. In FIG. 1, the connection box is an "up-flow" connection box, with the dart valve D in partition E between chambers F, G defined by baffle H with weir I. When dart valve D is open, process liquid flows through opening J at the bottom of cell B, upwardly through the open port in partition E, and through side opening K into cell C. In contrast, FIG. 2 (in which like parts are indicated by like primed reference letters) illustrates a "down-flow" connection box A' in which process liquid flows downwardly through the port in partition E' controlled by dart valve D'. Partition E' separates upper and lower chambers F, G' of the connection box. FIG. 3 illustrates a known arrangement using a pinch valve L" between cells B" and C" having openings J" and K" respectively.

More recently, ore processing plants have been built with very large cells, greater than 40 cubic meters volume, as opposed to the older plants which have cells of around 10 cubic meters. Accordingly, connection and discharge boxes have correspondingly increased in size and their construction is now a significant component of the cost of supplying a new row of cells.

It is an object of the invention, at least in the particular application under discussion, to provide a row of flotation cells at a lower cost while consistently achieving the required process liquid level.

SUMMARY OF THE INVENTION

It has been realised that an improved arrangement can be obtained by dispensing with connection and discharge boxes, and substituting direct valving at a port directly communicating adjacent cells. Moreover, it has been appreciated that, because most plants currently operating also use sensitive electronic process liquid level control means which is coupled to valve actuators to enable a swifter and more accurate reaction to process liquid level variation within cells, it is practicable to eliminate overflow weirs and therefore boxes associated with such weirs.

The invention generally provides a row of cells through which in use a process liquid flows in turn, including a first bank of cells and a second bank of cells, being the bank immediately downstream of the first bank, both banks having a first cell being the most upstream cell and a last cell being the most downstream cell, in which one or both of the last cell in the first bank and the first cell of the second bank are structured to define a port with a rim disposed substantially in a vertical plane, through which port in use process liquid flows, preferably substantially horizontally, from said last cell in the first bank to said first cell in the second bank; and wherein there is further provided a valve member mounted for movement to and from said rim to control flow of process liquid through said port.

Said port may be defined in wall means separating the interiors of the respective cells. For example, the cells may have facing and juxtaposed open ends defining an opening between the cells, and the wall means may be a partition mounted in the opening.

In a preferred embodiment, the valve member is a conical valve member, eg of a dart valve. Preferably, the dart valve is controlled by controlling means connected to process liquid level monitoring means.

In one preferred embodiment, the dart valve has an actuating arm which is located on a downstream side of the dart valve and connected hingedly to an internal wall of the first cell of the second bank. Preferably, an actuating means associated with a process liquid level monitoring means is connected to the actuating arm to close the dart valve. The actuating means may also assist in opening the dart valve. Preferably, the actuating means is connected to the actuating arm such that rotation of the connecting arm at the hinged connection causes the dart valve to open or close. The actuating means is preferably pneumatic.

In another preferred embodiment, the actuating arm for the dart valve is connected to an upstream side of the dart valve and to an internal surface of the last cell in the upstream bank. Again, an actuating means is preferably connected to the actuating arm.

In a further preferred embodiment, the last cell in the most downstream bank has a valve, directly connecting the last cell to the discharge pipe or chute.

DESCRIPTION OF THE DRAWINGS

Preferred embodiments of the invention will now be illustrated by way of example only with reference to FIGS. 4 to 8 inclusive of the accompanying drawings, in which.

For convenience only, like components in the drawings are referred to by like numerals.

DESCRIPTION OF PREFERRED EMBODIMENTS

Figure 1:
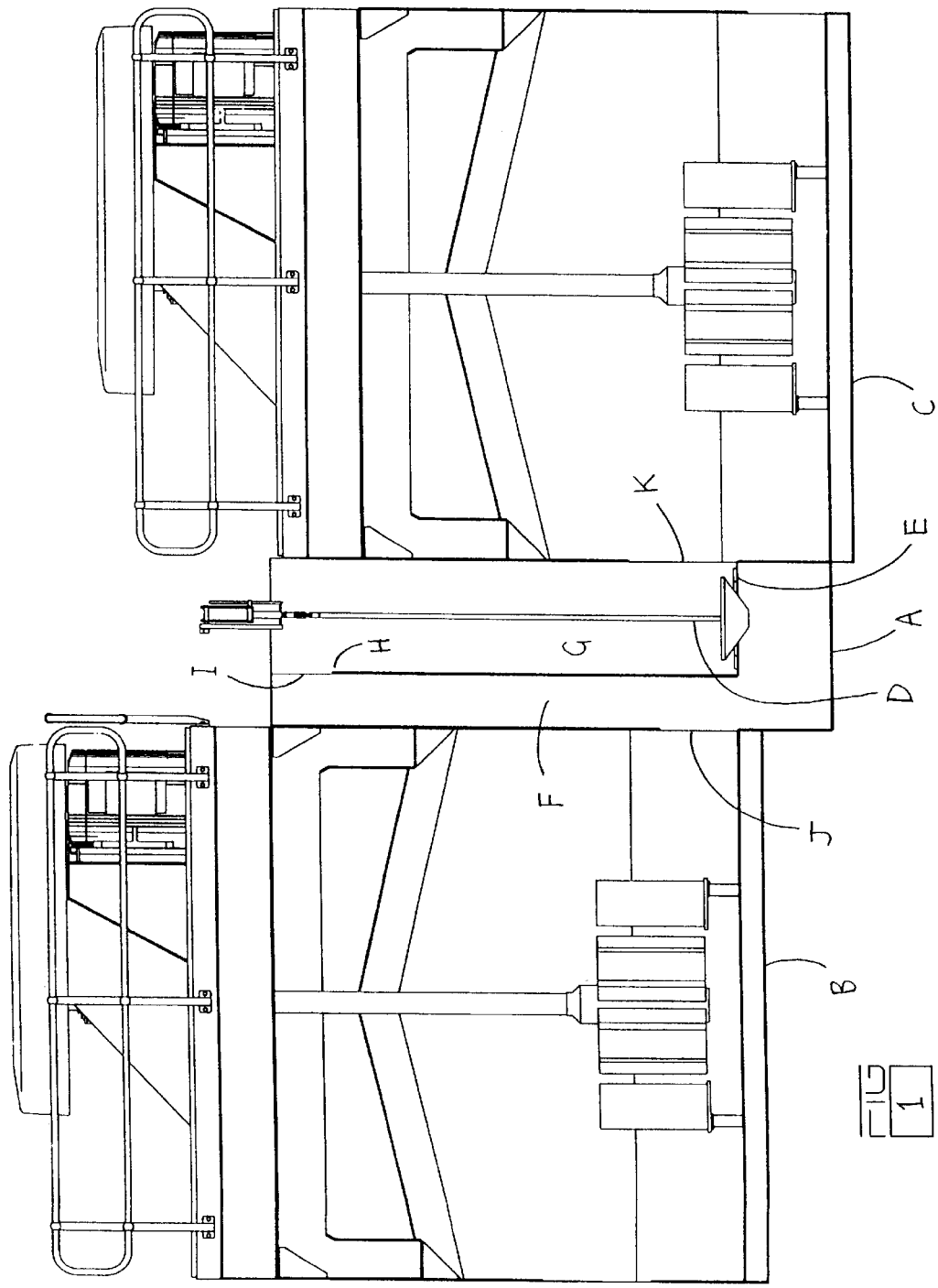
FIGS. 1–3 illustrate prior art arrangements of flotation cells and valves.
Figure 2:
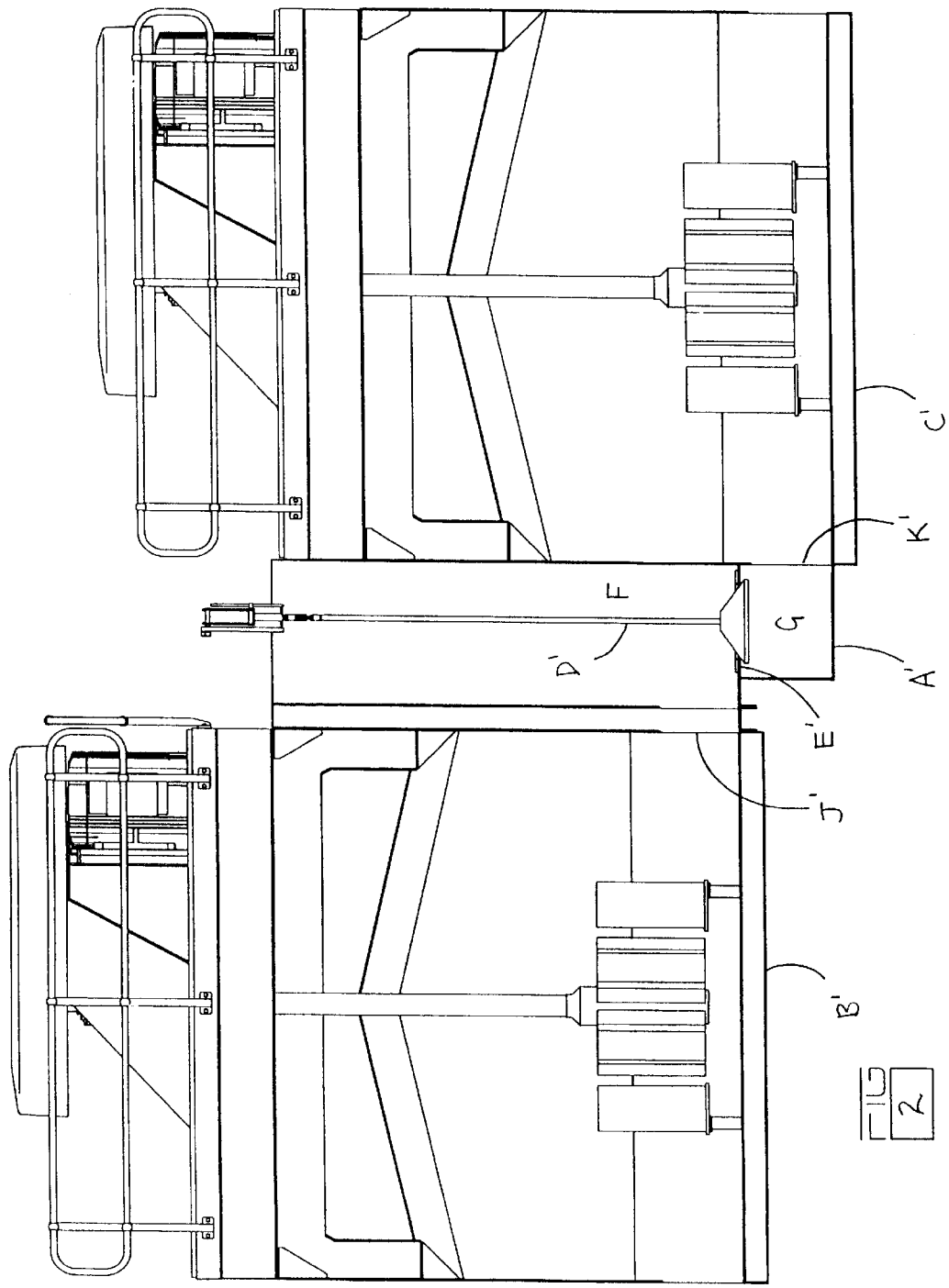
Figure 3:
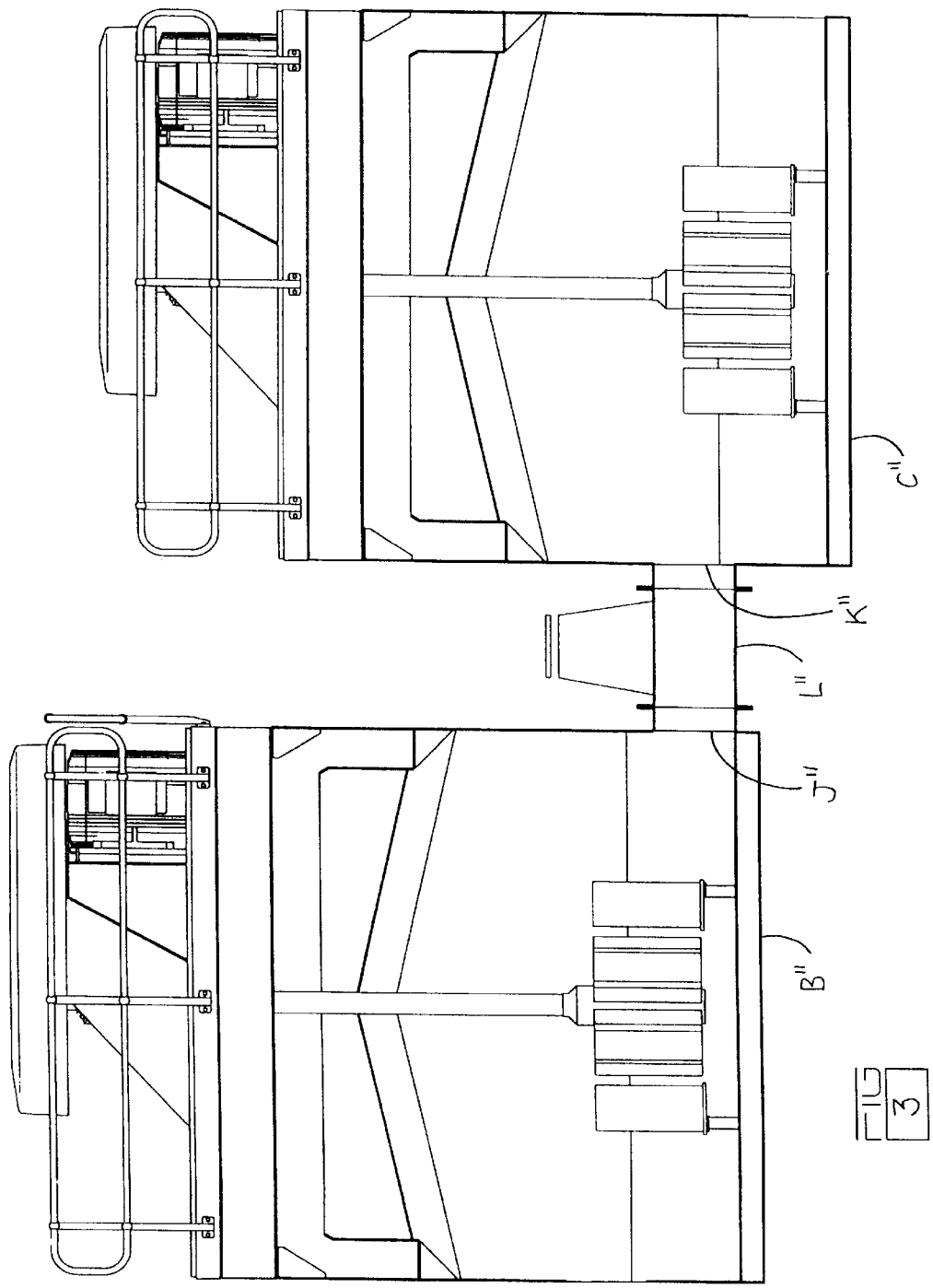
Figure 4:
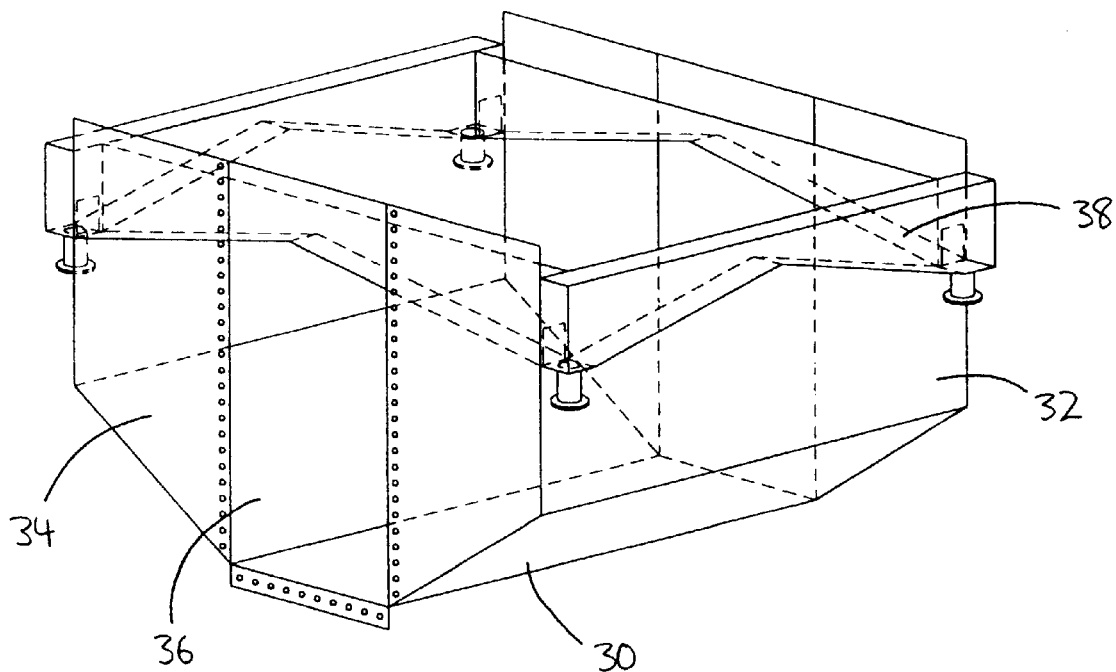
FIG. 4 is a simple perspective diagram of a cell of a kind typically employed in a row of cells for froth flotation.
Figure 5:
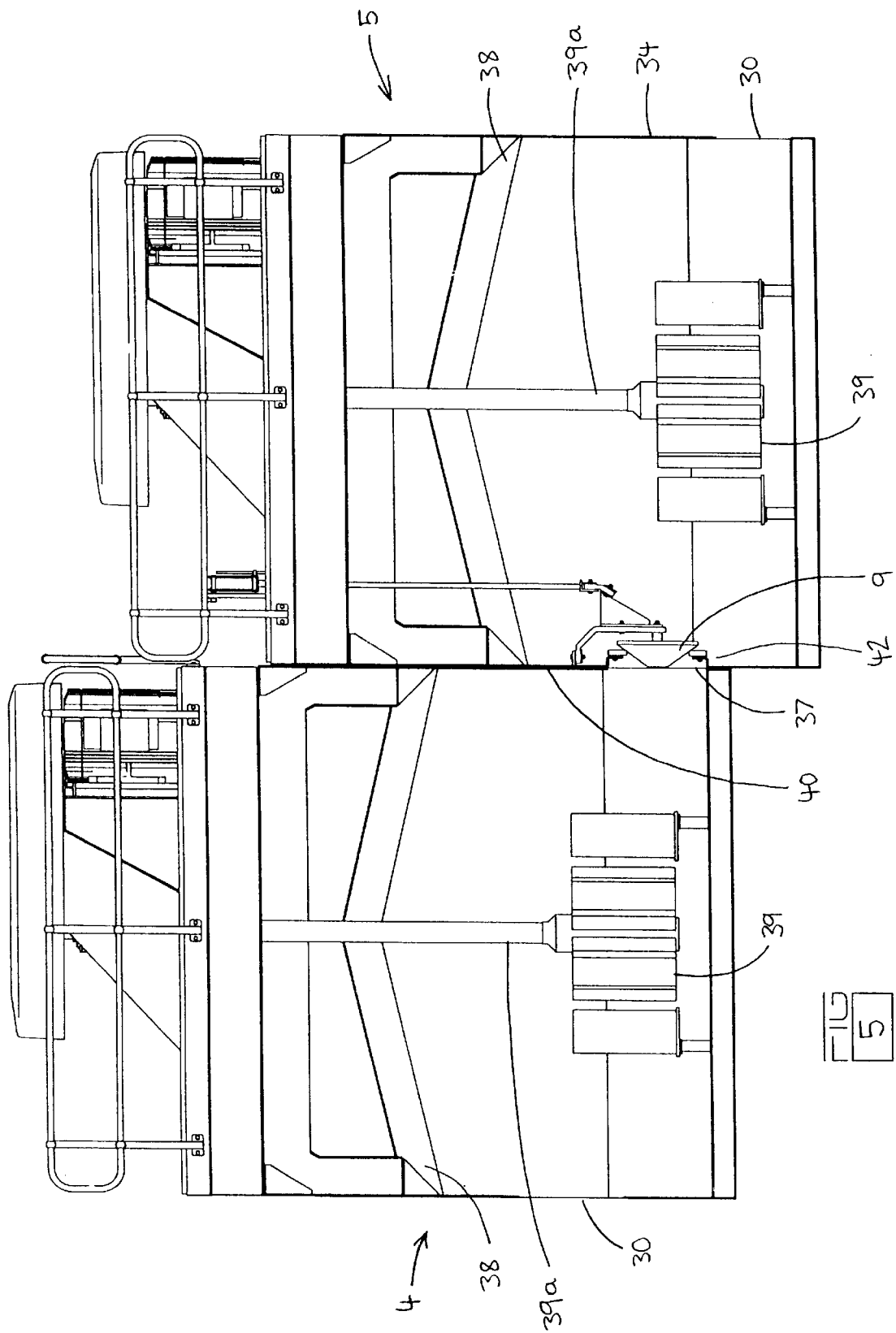
FIG. 5 shows diagrammatically, in cross-section, the connection of two banks of cells in a froth flotation row according to a first preferred embodiment of the invention with the dart valve assembly of FIG. 13.

FIG. 5 shows cells 4 and 5 in a row of cells for froth flotation. Cell 4 is the last (or most downstream) in a first bank of cells and cell 5 is the first (or most upstream) in a second bank of cells. The other cells in the banks are not shown. Each cell 4, 5 is of a conventional kind depicted in FIG. 4, and includes a trough-like base 30, side walls 32 and two-part end wall structures 34 defining central end openings 36 extending the full height of the cell. Bach cell has an upper peripheral launder structure 38 on end wall structures 34 and side walls 32, and a rotatable impeller or agitator 39 on shaft 39a.

Figure 12:
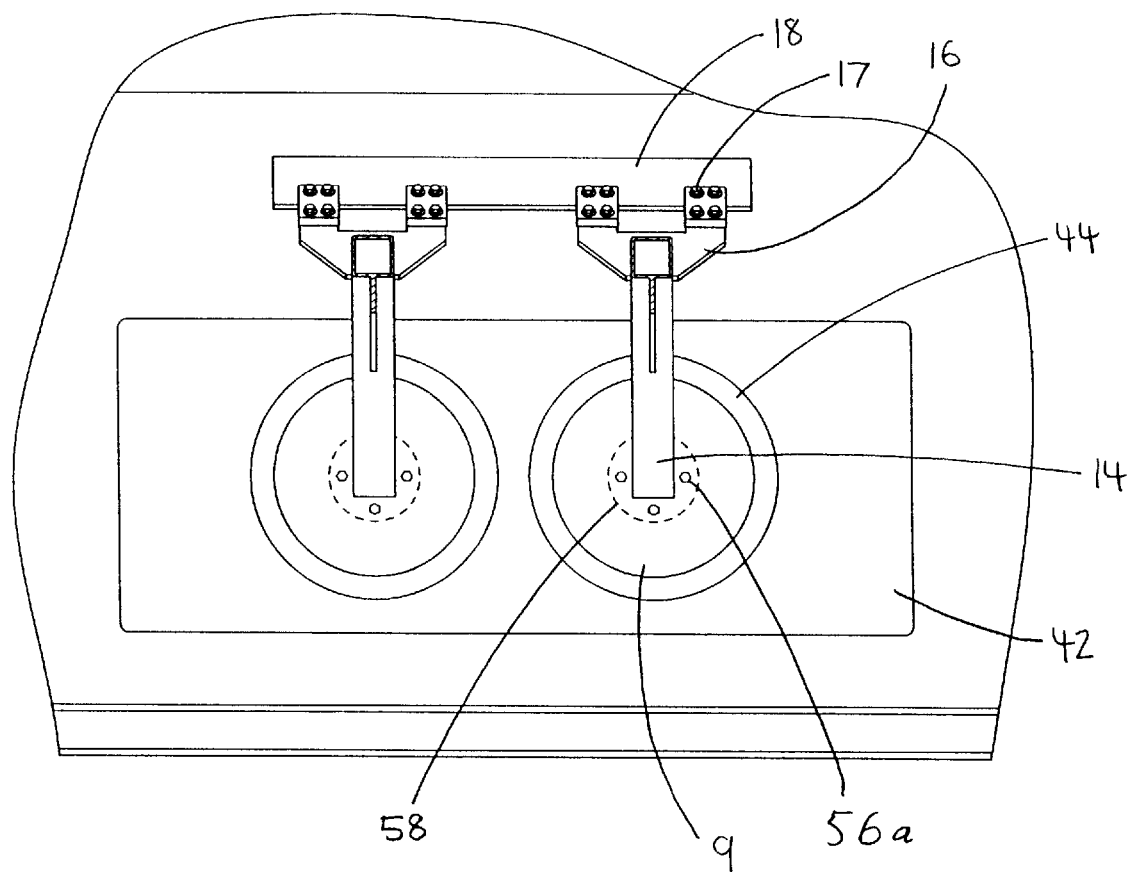
FIG. 12 is a view from right to left of the lower part of FIG. 8.

The cells 4, 5 are bought into end-to-end abutment so that the open ends are facing and juxtaposed. The resultant common opening is closed by a vertical plate partition 40 which is fixed to the end wall structures at the periphery of the opening. At its bottom end, partition 40 is fitted with an offset annular orifice plate 42 (FIG. 8) defining rims of two ports 37 (as more clearly shown in FIG. 12 which shows valve members 9 in both ports). An elastomeric gasket 44 lining plate 42 serves as a valve seat for a conical valve member 9 of a dart valve assembly 10 for each port 37.

It will be seen that cell 4 is in direct fluid communication with cell 5 via ports 37. Further, the flow of process liquid between cell 4 and cell 5 through ports 37 in partition 40 is controlled by dart valve 10.

Other components of cells 4 and 5 not directly relevant to the invention are also shown to better illustrate the context in which the invention may be used. It will be appreciated that cells 4 and 5 could be round in cross-section (in plan view) rather than rectangular with the port defined by a flange adjacent to an opening in the cell wall.

Figure 13:
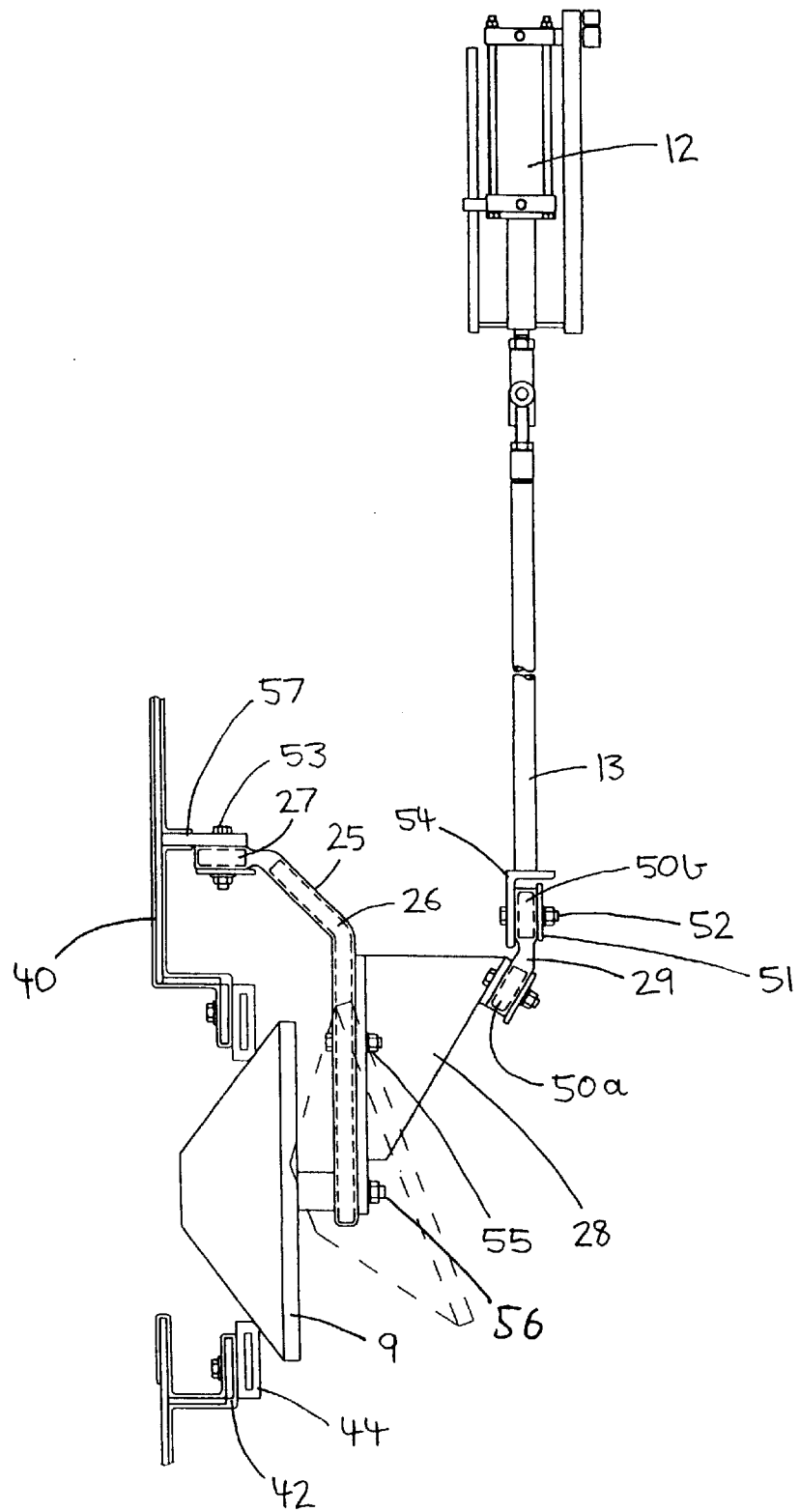
FIG. 13 is a cross-section of the dart valve assembly shown in FIGS. 5 to 7 in its closed position.

Two preferred embodiments of dart valve assembly 10 will now be described in more detail with reference to FIGS. 8 to 13. One embodiment is illustrated in FIGS. 8 to 12 and the other is illustrated in FIG. 13, and also in FIGS. 5 to 7. It will be apparent that both dart valve assemblies operate on the same general principles. The dart valve assembly illustrated in FIGS. 8 to 12 is preferred in larger tanks where the forces are much greater.

Figure 8:
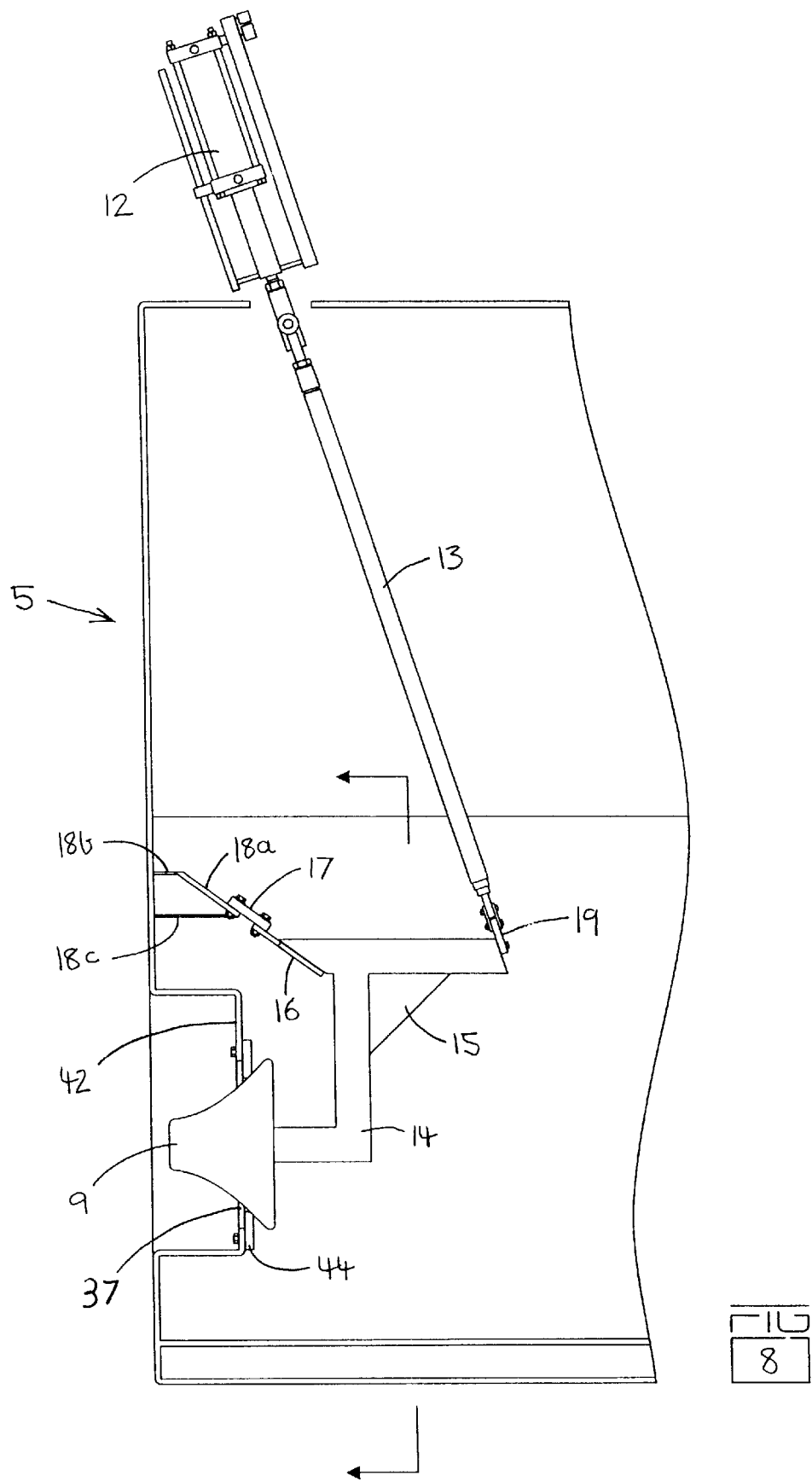
FIG. 8 is a side elevation of a second dart valve assembly in its closed position of a type appropriate for use in the embodiments of FIGS. 5 to 7 .

It will be appreciated that there is a dart valve assembly 10 for each port 37. Referring first to FIG. 8 which illustrates one preferred embodiment, a dart valve assembly 10 is shown diagrammatically in a cell 5 (which is round in cross-section), being the first cell in a downstream bank. The controlling means for dart valve assembly 10 is not shown. It is known to one skilled in the art as a controller and is the link between the pulp level monitor and the valve actuator to control the level of pulp in the cells. The controlling means cooperates with process liquid monitoring means (not shown, but examples are float switches, bubble tubes, strain gauges and ultrasonic detectors) such that the level of process liquid flowing through the cells is maintained constant as required for optimum processing by opening and closing the ports 37 by valve assembly 10 to increase and decrease respectively the volume of process liquid permitted to flow through the port 37. The controlling means controls the actuator 12, which open and closes valve member 9. Actuator 12 is preferably a pneumatic actuator although one skilled in the art will appreciate that other types of actuators could be used within the scope of the invention. Actuator 12 acts on actuating arm 13 which is connected by hinging arm 14 to valve member 9. The connection between actuating arm 13 and hinging arm 14 is a hinged connection, including hinge 19 as more clearly shown in FIG. 11. Hinge 19 is of the same construction as hinge 17 described below. As appears from FIG. 11, a rod 24 extending from actuating arm 13 is connected by means of parallel steel plates 54 either side of hinge 19 being clamped together by a bolt running through the bolts and hinge. The other end of hinge 19 is bolted to hinging arm 14.

FIG. 8 further illustrates that hinging arm 14 includes a steel gusset 15 for reinforcement. Hinging arm 14 is preferably made from mild steel tube of generally square cross-section, in which case there are two gussets 15 aligned with both sides of hinging arm 14. Hinging arm 14 is welded to splay plate 16 which is preferably of mild steel plate. As can be seen more clearly in FIG. 12, splay plate 16 extends either side of hinging arm 14 such that there are two parallel hinges 17 connecting splay plate 16 to hinge mounting plate 18a. Hinge mounting plate 18a is mild steel plate of 20 millimeter thickness which is mounted at an angle of approximately 45 degrees on supporting flanges 18b and 18c of 6 millimetre thickness, which are welded to hinge mounting plate 18a. Although not shown in the crosssection drawing, mounting flanges 18b and 18c would have supporting gussets along the cell wall or partition 40. As will be seen in more detail in FIG. 10, hinge 17 comprises a hinge of steel, having two leafs 20a and 20b (shown in dotted outline) pivoting around pin 21. The steel hinge is coated in elastomer for protection in the process liquid cell environment in a manner known to one skilled in the art. Bolts 22a and 22b are used for affixing the hinge and are located in bushes (not shown) which extend through leafs 20a and 20b to protect the elastomer coating of hinge 17 from being squashed and damaged on tightening of bolts 22a and 22b. One end of hinge 17 is affixed to splay plate 16 and the other end to hinge mounting flange 18a.

Valve member 9 is constructed of polyurethane with an embedded steel plate 58. Hinging arm 14 has a matching plate which is bolted to the steel plate 58 of valve member 9 by four spaced bolts 56a. When valve member 9 is in its closed position, it abuts elastomeric gasket 44 to form a seal.

FIG. 13 illustrates a dart valve assembly as shown in FIG. 8 but where the valve member 9 is in its open position. It will be appreciated that valve member 9 has a number of open positions depending upon the position of actuating arm 13 such that the flow of process liquid through port 37 can be accurately controlled.

Figure 6:
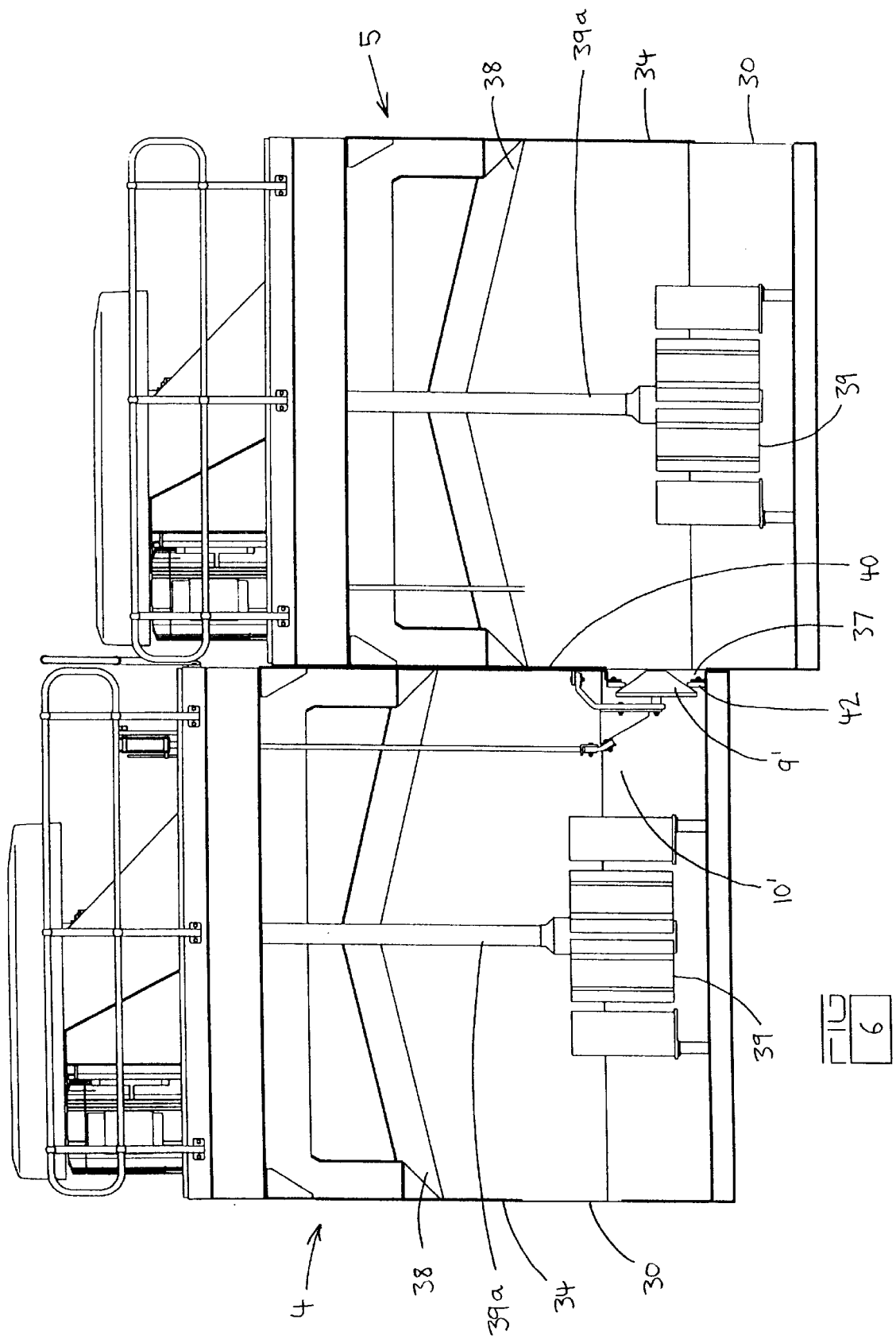
FIG. 6 is a view similar to FIG. 5 of two banks of cells in a froth flotation row according to a second preferred embodiment of the invention with the dart valve assembly of FIG. 13.
Figure 7:
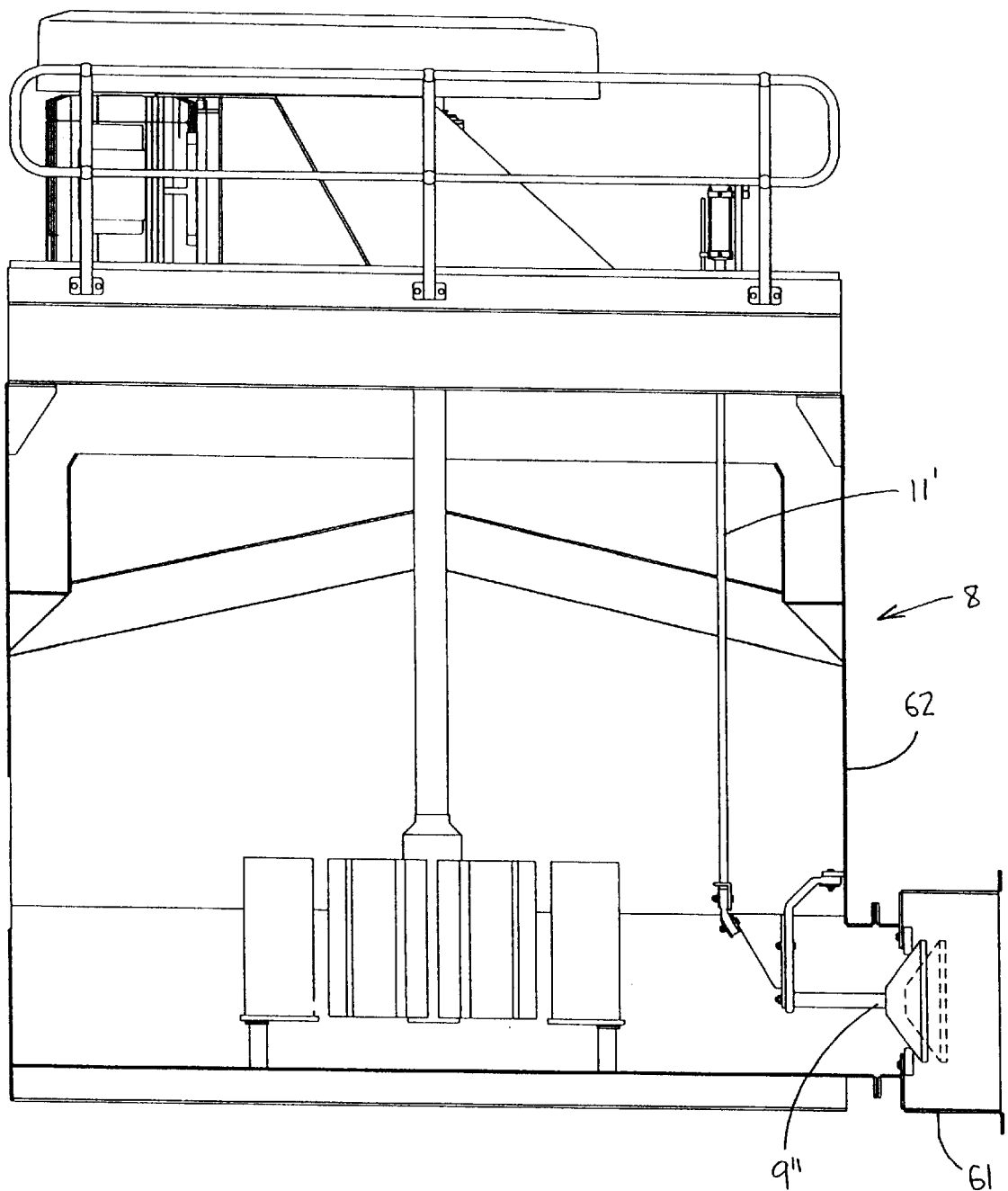
FIG. 7 shows diagrammatically a cross-section of the last cell in a row in accordance with a third preferred embodiment of the invention with the dart valve assembly of FIG. 13.

FIG. 13 illustrates an alternative dart valve assembly, which is the assembly also shown (in less detail) in FIGS. 5 to 7. The dart valve assembly in FIG. 13 is shown in its closed position, with the position of valve member 9 shown in the open position in dotted outline. It similarly has an actuator 12 and actuating arm 13. Actuating arm 13 is connected to hinging plate 28 by hinge 29. Hinge 29 comprises an elastomeric hinge, having two steel blocks 50a and 50b (shown in dotted outline) for reinforcement where it is connected to other components. The hinge is attached by clamping between connection plate 54 at the end of actuating arm 13 and a plate 51 (which acts as a washer) for bolt 52 which extends through hinge 29 and is tightened.

Similarly, the lower end of hinge 29 is affixed to hinging plate 28. Dart valve assembly 11 also includes hinging arm 25 which is elastomeric with a steel core 26 shown in dotted outline. Hinging arm 25 is affixed to the edge of hinging plate 28 by bolt 55. The upper end of hinging arm 25 is affixed to hinge mounting flange 57 by bolt 53. Steel block 27 reinforces hinging arm 25 at this point. Hinging arm 25 connects to valve member 9 by a bolt at 56. It will be apparent that upon actuating arm 13 being raised by actuator 12, hinging arm 25 flexes between block 27 and steel core 26 permitting valve member 9 to move from its closed position to the position shown in dotted outline. Such movement also causes hinge 29 to flex.

In use, actuator 12 will be necessary to close the valve member 9 but the pressure of process liquid flowing onto valve member 9 will facilitate it opening when required.

In the embodiment shown in FIG. 6, a different embodiment is shown in which the dart valve assembly 10' is located in cell 4, rather than cell 5 and it will be appreciated that the actuating means will be required to open the valve 9' but the flow of process liquid will facilitate the closing of the valve in this arrangement.

Figure 9:
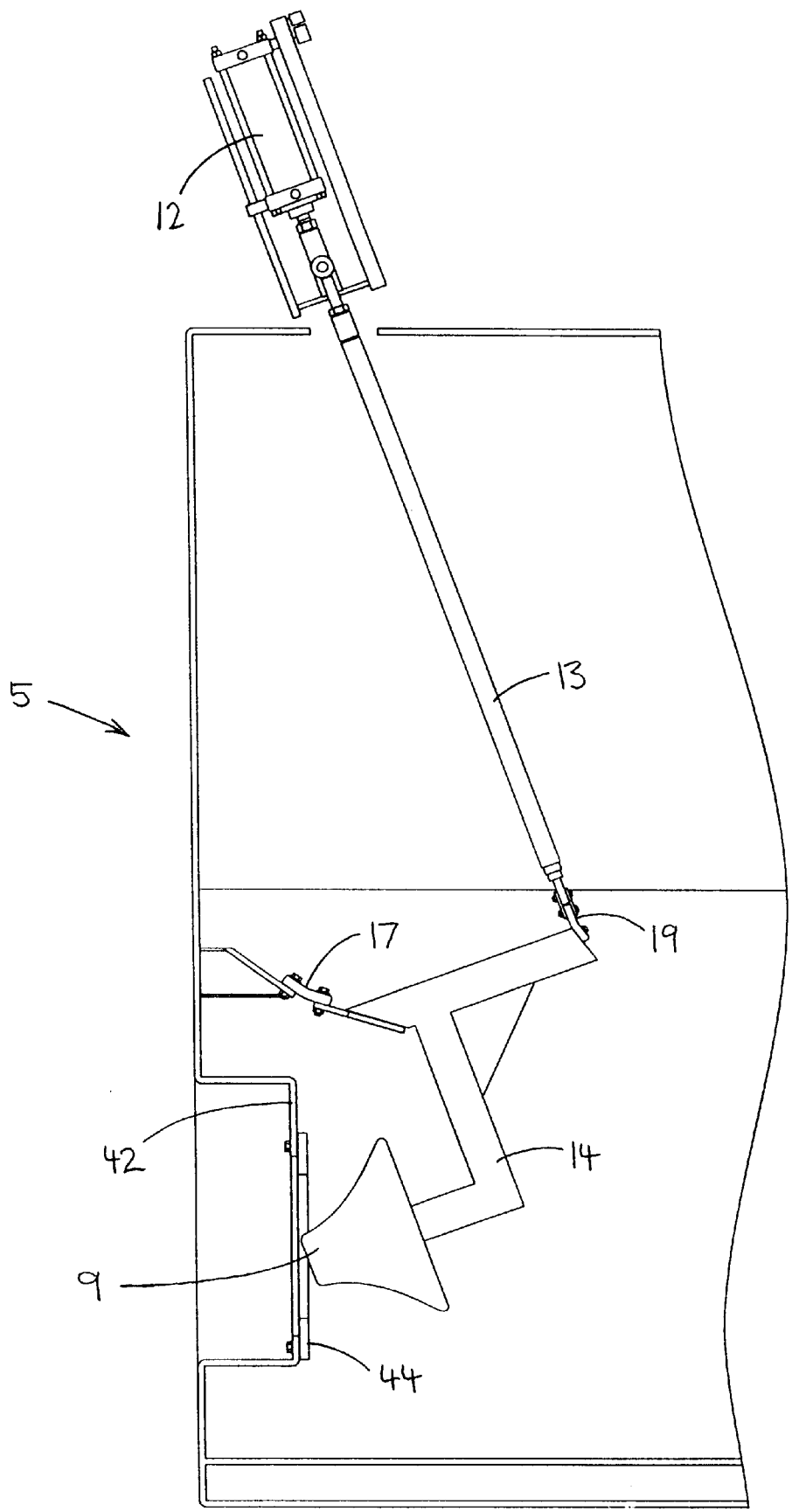
FIG. 9 is a side elevation of the dart valve assembly of FIG. 8 in its open position.
Figure 10:
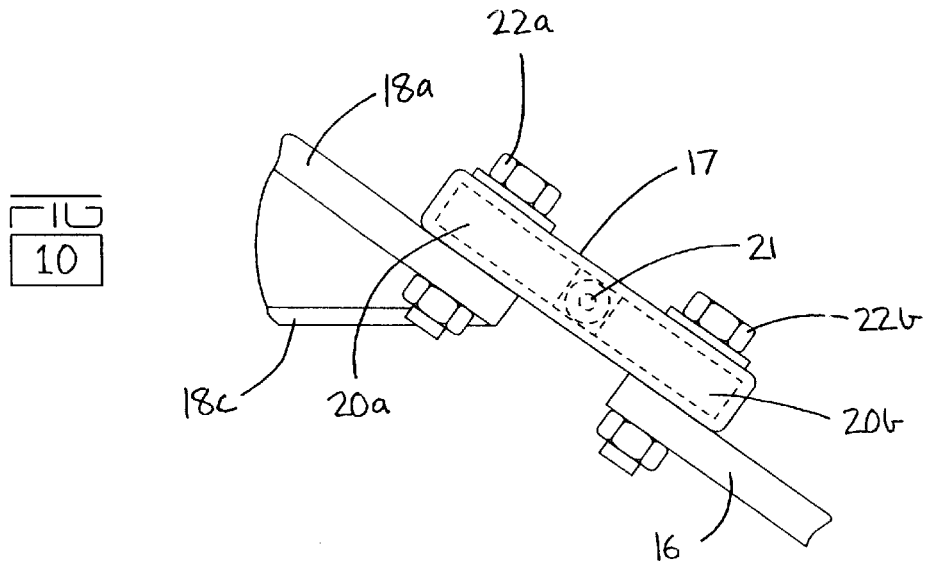
FIG. 10 is an expanded side elevation of hinge 17 forming part of FIG. 8.
Figure 11:
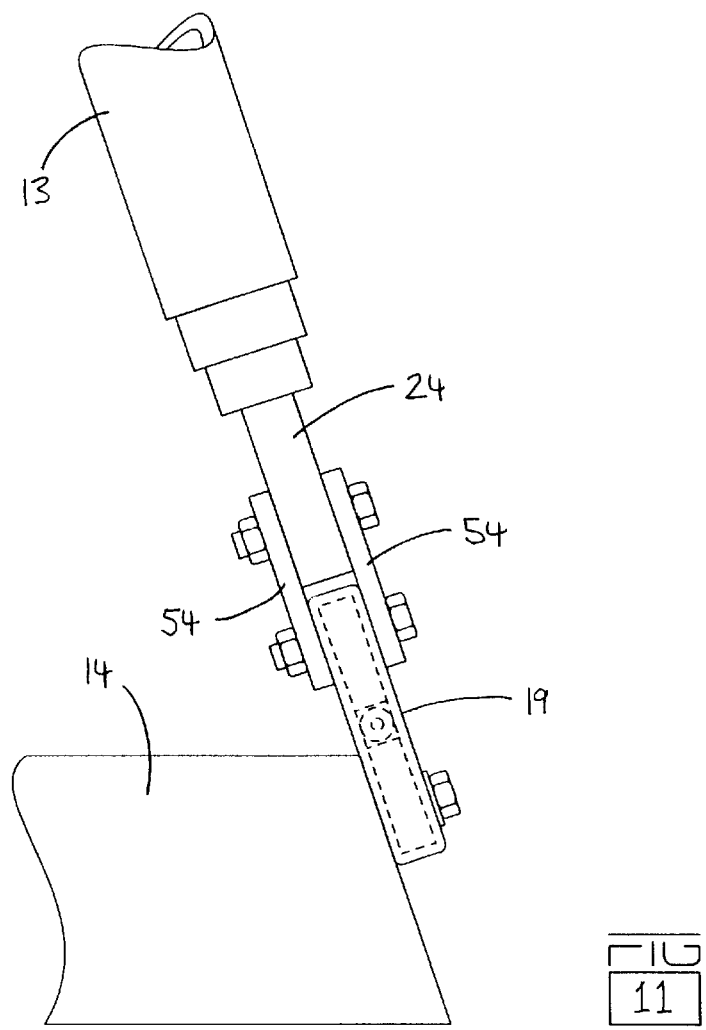
FIG. 11 is an expanded side elevation of hinge 23 forming part of FIG. 8.

Actuating means 12 is shown located generally above dart valve assembly 10 in FIGS. 8 and 9. The skilled person in the art will appreciate that the location of actuating means 12 could, in practice, be varied without affecting the scope or operation of the invention. In practice, actuating means 12 is connected to process liquid level monitoring means (not shown) to determine whether valve 9 should be opened or closed. Depending on the mechanism used for actuating means 12, valve 9 may be opened to any extent between the open and closed positions shown in FIG. 8 or 13 or for better controlling the flow of process liquid through the row.

A different embodiment of the invention is shown in FIG. 7 in which bank 3 is the last bank in a row and has a dart valve 9" located in the last or most downstream cell 8 of bank 3. Dart valve 9" is located in the downstream wall 62, at the outlet to a discharge pipe or chute 61, and controls the flow of process liquid from cell 8 to chute 61 through wall 62.

As would be appreciated by the skilled person in the an, the actuating means for the dart valve will usually be pneumatic. Appropriate materials to manufacture a dart valve and the cells involved in the invention are well known to those skilled in the art An appropriate elastomer is polyurethane or rubber.

It will be apparent from the preceding description that a row of cells for froth flotation as described above will be cheaper to construct due to the omission of connection boxes and discharge boxes, without sacrificing the required level of control of the process liquid in the cells.

Other advantages and modification to the basic invention and its construction as described above, will be apparent to those skilled in the art and all modifications and adaptations are included in the scope of the invention.

I claim:

1. A flotation cell row including:

a row of cells through which in use a process liquid flows in turn, including a first bank of cells having a last cell, being the most downstream cell in the first bank, and a second bank of cells having a first cell, being the most upstream cell in the second bank, the second bank being the bank immediately downstream of the first bank, the first cell and the last cell having facing and juxtaposed open ends defining an opening between the cells, and a wall is a partition mounted in the opening, a port defined by one or both of the last cell and the first cell through which in use the process liquid flows from the last cell to the first cell, the port having a rim, the port being defined in the wall separating the interiors of the respective cells, and there existing two adjacent ports between the first cell and last cell, a valve member mounted for movement between a closed position abutting the rim and an open position spaced from the rim, to control flow of process liquid through the port, the valve member being a dart valve, conical in shape, and controlling means to control movement of the valve member, the controlling means including an actuator having an actuating arm and hinging means to connect the actuating arm to the valve member such that the actuator moves the valve member.

2. A flotation cell row according to claim 1 in which the hinging means and valve member are both located in the first cell.

3. A flotation cell row according to claim 2 in which the hinging means is mounted on an internal surface of the first cell.

4. A flotation cell row according to claim 1 in which the hinging means and valve member are located in the last cell.

5. A flotation cell row according to claim 4 in which the hinging means is mounted on an internal surface of the last cell.

6. A flotation cell row according to claim 1 in which the hinging means is hingedly connected to the actuating arm and the valve member such that it partially rotates upon movement of the valve member.

7. A flotation cell row according to claim 6 further including process liquid level monitoring means associated with the controlling means, such that the controlling means maintains the level of process liquid in the banks between a predetermined minimum and maximum by opening and closing the valve member.

8. A flotation cell row according to claim 7 in which the actuator is pneumatic.

9. A flotation cell row according to claim 1 in which the dart valve has an elastomeric outer layer and the rim includes an elastomeric outer layer which, in use, is a seat for the valve member.

10. A flotation cell row including:

a row of cells through which in use a process liquid flows in turn, including a first bank of cells having a last cell, being the most downstream cell in the first bank, and a second bank of cells having a first cell, being the most upstream cell in the second bank, the second bank being the bank immediately downstream of the first bank, a port defined by one or both of the last cell and the first cell through which in use the process liquid flows from the last cell to the first cell, the port having a rim, a valve member mounted for movement between a closed position abutting the rim and an open position spaced from the rim, to control flow of process liquid through the port, and controlling means to control movement of the valve member, the controlling means including an actuator having an actuating arm and hinging means to connect the actuating arm to the valve member such that the actuator moves the valve member.

11. A flotation cell row according to claim 10 in which the hinging means and valve member are both located in the fist cell.

12. A flotation cell row according to claim 11 in which the hinging means is mounted on an internal surface of the first cell.

13. A flotation cell row according to claim 10 in which the hinging means and valve member are located in the last cell.

14. A flotation cell row according to claim 13 in which the hinging means is mounted on an internal surface of the last cell.

15. A flotation cell row according to claim 10 in which the hinging means is hingedly connected to the actuating arm and the valve member such that it partially rotates upon movement of the valve member.

16. A flotation cell row according to claim 15 further including process liquid level monitoring means associated with the controlling means, such that the controlling means maintains the level of process liquid in the banks between a predetermined minimum and maximum by opening and closing the valve member.

17. A flotation cell row according to claim 16 in which the actuator is pneumatic.

18. A flotation cell row according to claim 17 in which the valve member is a dart valve.

19. A flotation cell row according to claim 18 in which the dart valve has an elastomeric outer layer and the rim includes an elastomeric outer layer which, in use, is a seat for the valve member.

20. A flotation cell row according to claim 16 in which the last cell is located in the most downstream bank of cells in the cell row and the second bank of cells, including the first cell, is replaced by a discharge pipe or chute.

21. A flotation cell row including:

a row of cells through which in use a process liquid flows in turn, including a first bank of cells having a last cell, being the most downstream cell in the first bank, and a second bank of cells having a first cell, being the most upstream cell in the second bank, the second bank being the bank immediately downstream of the first bank, a port defined by one or both of the last cell and the first cell through which in use the process liquid flows from the last cell to the first cell, the port having a rim, an elastomeric dart valve member mounted for movement between a closed position abutting the rim and an open position spaced from the rim, to control flow of process liquid through the port, controlling means to control movement of the valve member, the controlling means including an actuator having an actuating arm and hinging means to connect the actuating arm to the valve member such that the actuator moves the valve member, wherein the hinging means is mounted on an internal surface of the first cell or the last cell and is hingedly connected to the actuating arm and the valve member such that it partially rotates upon movement of the valve member, and process liquid level monitoring means associated with the controlling means, such that the controlling means maintains the level of process liquid in the banks between a predetermined minimum and maximum by opening and closing the valve member.

22. A flotation cell row including;
a row of cells through which in use a process liquid flows in turn, including a bank of cells having a last cell, being the most downstream cell in the bank, and a discharge pipe or chute having an inlet being immediately downstream of the last cell,
a port defined between the last cell and the discharge pipe or chute through which in use the process liquid flows directly from the last cell to the discharge pipe or chute, the port having a rim,
a valve member mounted for movement between a closed position abutting the rim and an open position spaced from the rim, to control flow of process liquid through the port, and
a controlling means for controlling movement of the valve member, the controlling means including an actuator having an actuating arm and hinging means to connect the actuating arm to the valve member such that the actuator moves the valve member.

* * * * *